United States Patent [19]

Hazel

[11] Patent Number: 4,531,621
[45] Date of Patent: Jul. 30, 1985

[54] FLOW CONTROL VALVE FOR FLUID FAN DRIVE

[75] Inventor: Michael E. Hazel, Bellevue, Mich.
[73] Assignee: Eaton Corporation, Cleveland, Ohio
[21] Appl. No.: 565,549
[22] Filed: Dec. 27, 1983
[51] Int. Cl.³ .............................................. F16D 35/00
[52] U.S. Cl. ..................................... 192/58 B; 192/96
[58] Field of Search ...................... 192/58 B, 82 T, 96; 123/41.12; 416/32, 169 A

[56] References Cited

U.S. PATENT DOCUMENTS

| | | | |
|---|---|---|---|
| 3,135,370 | 6/1964 | Sutton | 192/58 |
| 3,339,688 | 9/1967 | Harvey | 192/58 |
| 3,419,122 | 12/1968 | Connelly | 192/58 |
| 3,792,697 | 2/1974 | Walter et al. | 192/82 T |
| 4,086,987 | 5/1978 | Riley et al. | 192/58 B |
| 4,351,425 | 9/1982 | Bopp | 192/58 B |
| 4,351,426 | 9/1982 | Bopp | 192/58 B |

*Primary Examiner*—Leonard E. Smith
*Attorney, Agent, or Firm*—C. H. Grace; L. J. Kasper

[57] ABSTRACT

A fluid coupling device is disclosed of the type including an input coupling member (11) rotatably disposed within an output coupling assembly (13). A portion of the output coupling assembly comprises a cover member (17) which cooperates with a housing member (15) to define an operating chamber (33), and cooperates with a cover member (35) to define a reservoir chamber (37). A cover member (17) also defines a pair of fluid inlet ports (51). A valve actuating member (55) is received in a central bore (53) defined by the input shaft (21). The coupling device includes a valving arrangement (57) including a U-shaped fulcrum element (59) and a flat, elongated valve element (61). The valve (61) passes through slots (69) in fulcrum portions (65) of the fulcrum element. The valve (61) includes terminal portion (67), such that forward movement of the actuation member (55) moves a central portion of the valve (61) forwardly, while moving the terminal portions (67) rearwardly to block fluid flow through the inlet ports (51).

7 Claims, 3 Drawing Figures

FLOW CONTROL VALVE FOR FLUID FAN DRIVE

BACKGROUND OF THE DISCLOSURE

The present invention relates to fluid coupling devices of the type including valve means operable to control the quantity of fluid in the fluid operating chamber. More particularly, the present invention relates to fluid coupling devices of the type including a valve element which is actuated to move in an axial direction between the open and closed positions.

Although the present invention may be utilized with various types of fluid coupling devices, it is especially adapted for use in remotely actuated fluid coupling devices, and will be described in connection therewith. In a remotely actuated coupling, movement of the valve element is normally in an axial direction, because movement of the valve is usually achieved by means of a device such as a solenoid or fluid pressure piston arrangement which inherently has an axial output movement.

Although the present invention may be utilized in fluid coupling devices having any type of axial actuation, it is especially adapted for use with some form of fluid pressure actuation, and will be described in connection therewith.

In many vehicle applications of fluid coupling devices, it is preferable to use rear actuation of the valve element, i.e., to actuate the valve element by means of a fluid pressure piston which is pressurized from the rear or water pump side of the coupling.

It is also desirable in many vehicle applications to provide a fluid coupling device which is "fail-safe," i.e., will operate in the relatively high speed, engaged mode in the absence of the external actuation input, such as the fluid pressure signal. Thus, if the source of fluid pressure fails, the coupling device will continue to operate in the engaged mode to prevent overheating of the vehicle engine.

SUMMARY OF THE INVENTION

Accordingly, it is an object of the present invention to provide an improved fluid coupling device utilizing an axially movable valve element which is rear actuated, wherein the operation of the valve element is "failsafe," as that term is used herein.

It is a more specific object of the present invention to provide an improved fluid coupling device in which forward movement of a fluid pressure actuating member results in rearward movement of at least a portion of a valve element to block fluid flow through the inlet port of the coupling device and achieve the disengaged mode of operation.

It is a further object of the present invention to provide an improved fluid coupling device which is capable of achieving the above-stated objects, and which is simple in both construction and operation.

The above and other objects of the present invention are accomplished by the provision of an improved fluid coupling device of the type including a first rotatable coupling member defining an axis of rotation, cover means associated with the first member to define a fluid chamber and valve means disposed to separate the fluid chamber into an operating chamber and a reservoir chamber. A second rotatable coupling member is disposed in the operating chamber and is rotatable relative to the first coupling member. One of the coupling members receives a rotary torque input by means of an input shaft. The valve means is operable to control the flow of fluid between the reservoir and the operating chamber and includes means defining a fluid inlet port. A valve member is disposed in the reservoir chamber and the device includes actuation means operable to move at least a portion of the valve member in an axial direction in response to an input signal.

The fluid coupling device is characterized by the actuation means including an actuating member disposed to move along the axis of rotation from a normal position forwardly toward the cover means when the input signal dictates operation in the disengaged mode. Either the valve means or the cover means defines first and second fulcrum points, disposed diametrically oppositely about the axis of rotation. The valve member comprises an elongated, generally flat member normally disposed in engagement with the first and second fulcrum points and including a central portion disposed between the fulcrum points. The actuating member is in engagement with the central portion of the valve member. The valve member includes a pair of terminal portions, at least one of which is disposed to be spaced axially forwardly of the fluid inlet port when the actuating member is in the normal position. As a result, movement of the actuating member toward the cover means results in corresponding movement of the central portion of the valve member and rearward movement of the terminal portion to a position blocking flow of fluid through the inlet port.

DESCRIPTION OF THE PREFERRED EMBODIMENT

Figure 1:
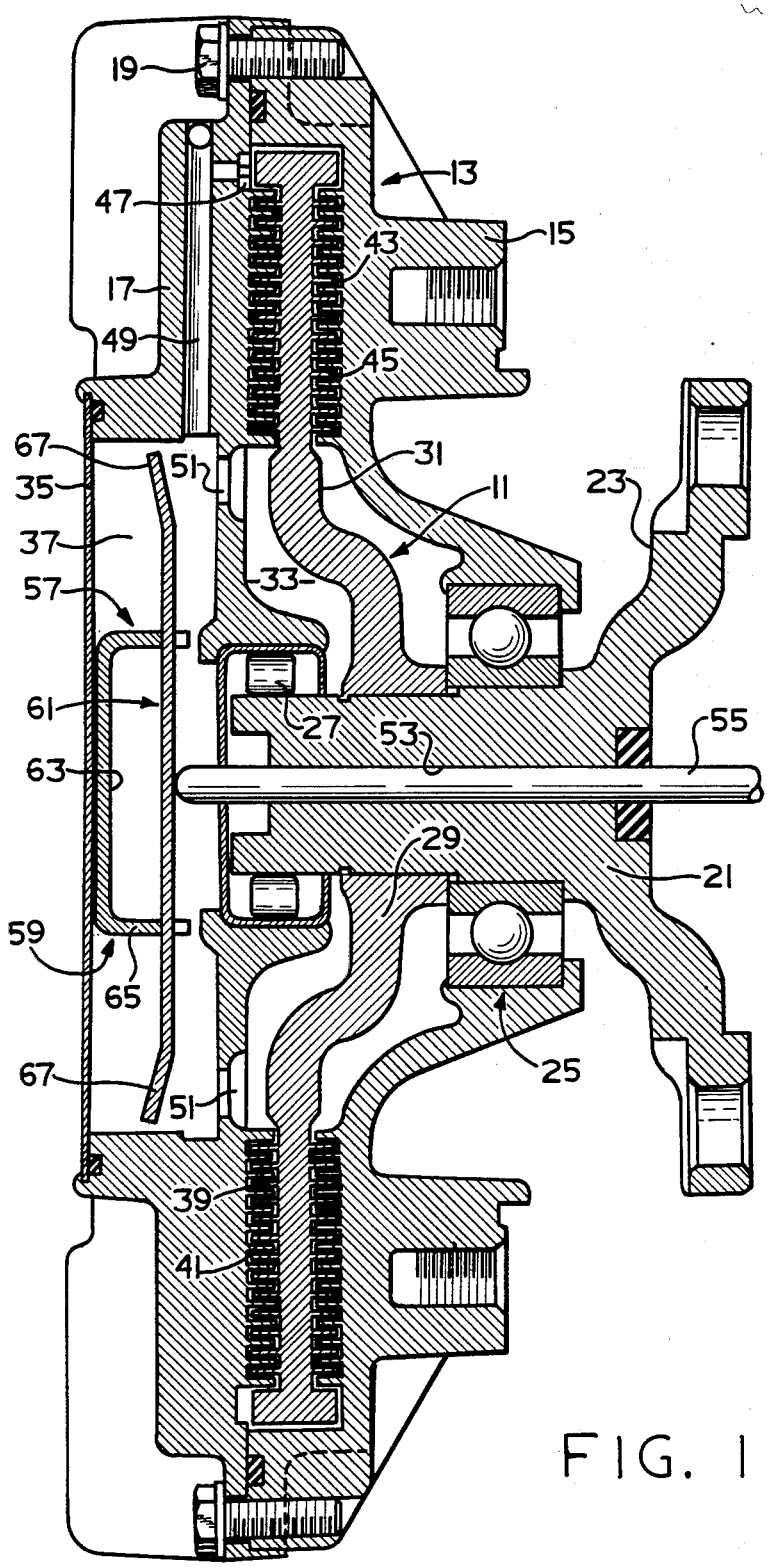
FIG. 1 is an axial cross-section of a fluid coupling device utilizing the present invention, with the valve element in the normally open position.

Referring now to the drawings, which are not intended to limit the invention, FIG. 1 illustrates one preferred embodiment of a fluid coupling device of the type in which the present invention may be utilized. The fluid coupling device includes an input coupling member generally designated 11, and an output coupling assembly, generally designated 13. The assembly 13 includes a cast metal housing member 15 and a cast metal cover member 17, the members 15 and 17 being secured together by a plurality of bolts 19. The construction and operation of the coupling device is described in greater detail in U.S. Pat. No. 4,281,750, assigned to the assignee of the present invention, and incorporated herein by reference.

The fluid coupling device includes an input shaft 21 having a flange 23 formed integrally therewith, the flange 23 being adapted for mounting to a mounting hub (not shown). The input shaft 21 functions as a support for the inner race of a bearing set 25 which is seated on the inside diameter of the housing member 15. Disposed around the outer periphery of the forward portion of the input shaft 21 is a set of roller bearings 27, which are disposed within a cage seated on the inside diameter of the cover member 17.

The input coupling member 11 is generally annular and includes a hub portion 29 and an annular disc-like portion 31. The hub portion 29 is pressed onto a portion of the input shaft 21, such that rotation of the shaft 21 causes rotation of the input coupling member 11.

The housing member 15 and the cover member 17 cooperate to define a fluid operating chamber 33, within which the input coupling member 11 is rotatably disposed. The cover member 17 cooperates with a stamped cover member 35 to define a fluid reservoir chamber 37.

As is well known in the art, the forward surface of the disc-like portion 31 forms a plurality of annular lands 39 which are interdigitated with a plurality of annular lands 41 defined by the cover member 17. Similarly, the rearward surface of the disc-like portion 31 forms a plurality of annular lands 43 which are interdigitated with a plurality of annular lands 45 defined by the housing member 15. The pairs of annular lands 39, 41, and 43, 45 each define a serpentine-shaped shear space therebetween which, when filled with suitable viscous fluid, results in the transmission of torque from the input member 11 to the output assembly 13.

As is also well known to those skilled in the art, adjacent the outer periphery of the shear space defined by the lands described previously is a pumping element 47 which pumps fluid out of the shear space and back into the fluid reservoir chamber 37 by means of a radial passage 49 defined by the cover member 17. The radially innermost portion of the cover member 17 defines a pair of inlet ports 51 through which fluid may flow from the reservoir chamber 37 into the operating chamber 33.

Valve Actuation

Referring still primarily to FIG. 1, the flow control valve means and actuation thereof will be described in some detail. The input shaft 21 defines an axially extending central bore 53 and disposed therein is an elongated, cylindrical actuating member 55. The subject embodiment of the present invention is referred to as being "rear actuated" because of the location of the actuating member 55, i.e., it is disposed in the rear portion of the coupling device or to the rear of the valve element, which will be described subsequently.

If the flange 23 of the input shaft 21 is attached to some sort of bracket assembly, the actuating member 55 may preferably extend axially into a fluid pressure chamber defined by a stationary portion of the bracket assembly. In such an arrangement, the application of a fluid pressure (typically air pressure) to the fluid chamber at the rear end of the actuating member 55 causes movement of the member 55 in a forward direction (i.e., to the left in FIG. 1) toward the cover member 35. The specific arrangement for supplying fluid pressure to the chamber and the end of the actuating member 55 is generally well known in the art, forms no part of the present invention, and is not shown or described in detail herein.

Referring still primarily to FIG. 1, the coupling device of the present invention includes a valving arrangement, generally designated 57, including two (2) primary elements, a fulcrum element 59 and a valve element 61.

The fulcrum element 59 comprises a generally U-shaped stamping including a base portion 63 which preferably is welded to the inside of the cover member 35, and a pair of axially-extending fulcrum portions 65. The valve element 61 comprises an elongated, flat spring steel member, as is typical and well known in the art generally. The valve element 61 includes a pair of terminal portions 67 which are bent or deformed at a small angle relative to the plane of the rest of the valve element 61.

Figure 2:
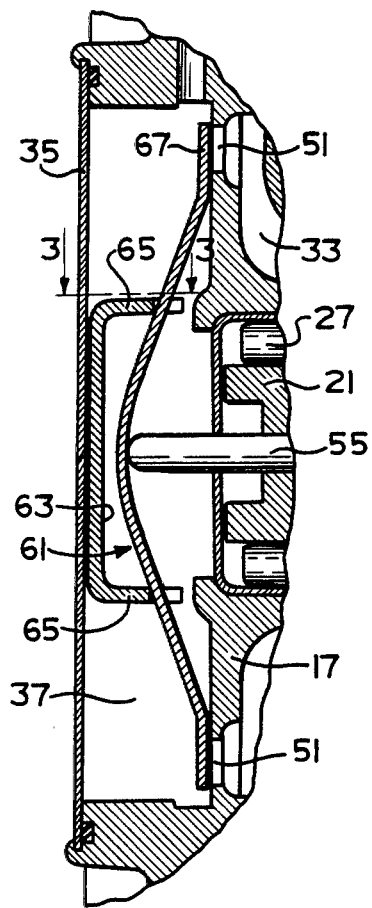
FIG. 2 is a fragmentary, axial cross-section, similar to FIG. 1, and on the same scale, showing the valve element actuated to the closed position.
Figure 3:
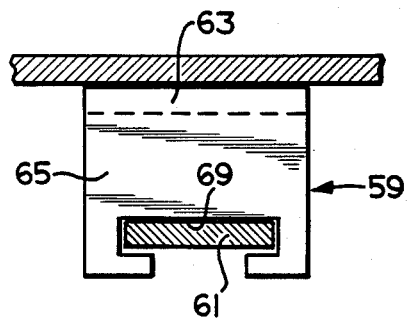
FIG. 3 is an enlarged, transverse cross-section taken on line 3—3 of FIG. 2.

Referring now primarily to FIGS. 2 and 3, it may be seen that each of the fulcrum portions 65 defines a slot 69, with the valve element 61 extending through the pair of slots 69, such that the valve is restrained from movement in an axial direction, relative to the fulcrum element 59.

In operation, when no fluid pressure input signal is applied to the end of the actuating member 55, the inherent spring force of the valve element 61 causes it to assume the position shown in FIG. 1, in which the central portion of the valve element 61 (i.e., the portion between the fulcrums 65) is in its rearward position. With the valve 61 in the unactuated position of FIG. 1, the terminal portions 67 are spaced forwardly of the inlet ports 51, thus uncovering the inlet ports and permitting fluid to flow freely from the reservoir chamber 37 through the ports 51 into the operating chamber 33, thus achieving the engaged mode of operation of the fluid coupling device as is well known in the art.

When it is desired to operate the fluid coupling device in its disengaged mode, a fluid pressure is applied to the actuating member 55, moving it in a forward direction (to the left in FIGS. 1 and 2) which also moves the central portion of the valve element 61 forwardly, toward the cover member 35. As may best be seen in FIG. 2, because of the engagement of the valve element 61 and the fulcrum portions 65, the forward movement of the central portion of the valve 61 results in rearward movement of the terminal portions 67 to their closed positions, blocking the flow of fluid from the reservoir chamber 37 through the inlet ports 51 into the operating chamber 33. As a result, fluid is pumped out of the operating chamber 33 by the pumping element 47, and the fluid coupling device operates in its disengaged mode.

The invention has been described in detail sufficient to enable those skilled in the art to make and use the same. Obviously, certain alterations and modifications of the invention will occur to others upon a reading and understanding of the specification and it is intended that all such alterations and modifications are a part of the invention, in so far as they come within the scope of the appended claims.

I claim:

1. A fluid coupling device of the type including a first rotatable coupling member defining an axis of rotation, cover means associated with said first member, to define a fluid chamber therebetween, valve means including a wall member disposed to separate said fluid chamber into a fluid operating chamber and a fluid reservoir chamber, a second rotatable coupling member disposed in said fluid operating chamber and being rotatable relative to said first coupling member, one of said coupling members receiving a rotary torque input by means of an input shaft, said valve means being operable to control the flow of fluid between said reservoir chamber and said operating chamber and including said wall member defining a fluid inlet port and a valve member disposed in said fluid reservoir chamber, actuation means operable to move at least a portion of said valve member in an axial direction in response to an input signal; characterized by:

(a) said actuation means including an actuating member disposed to move within an opening in said input shaft, along said axis of rotation, from a normal position forwardly toward said cover means when said input signal indicates a need to operate said fluid coupling device in a disengaged mode;

(b) one of said valve means and said cover means defining first and second fulcrum points, disposed diametrically oppositely about said axis of rotation;

(c) said valve member comprising an elongated, generally flat member normally disposed in engagement with said first and second fulcrum points and including a central portion disposed between said fulcrum points, said actuating member being in engagement with said central portion of said valve member; and (d) said valve member including a pair of terminal portions, one of which is disposed to be spaced axially forwardly of said fluid inlet port when said actuating member is in said normal position, whereby movement of said actuating member toward said cover means results in corresponding movement of said central portion of said valve member and rearward movement of said one of said terminal portions to a position blocking substantial flow of fluid through said inlet port.

2. A fluid coupling device of the type including a first rotatable coupling member defining an axis of rotation, cover means associated with said first member to define a fluid chamber therebetween, valve means including a wall member disposed to separate said fluid chamber into a fluid operating chamber and a fluid reservoir chamber, a second rotatable coupling member disposed in said fluid operating chamber and being rotatable relative to said first coupling member, said valve means being operable to control the flow of fluid between said reservoir chamber and said operating chamber and including said wall member defining first and second fluid inlet ports, and a valve member disposed in said fluid reservoir chamber, actuation means operable to move at least a portion of said valve member in an axial direction in response to an input signal; characterized by:

(a) said actuation means including an actuating member disposed to move along said axis of rotation from a normal position forwardly toward said cover means when said input signal dictates operation in a disengaged mode;

(b) said cover means defining first and second fulcrum points, disposed diametrically oppositely about said axis of rotation;

(c) said valve member comprising an elongated, generally flat member normal disposed in engagement with said first and second fulcrum points and including an actuation portion disposed between said fulcrum points, said actuating member being in engagement with said actuation portion of said valve member; and (d) said valve member including first and second terminal portions, disposed to be spaced axially forwardly of said first and second fluid inlet ports, respectively, when said actuating member is in said normal position, whereby movement of said actuating member forwardly toward said cover means results in corresponding movement of said actuation portion of said valve member, and rearward movement of said first and second terminal portions to positions blocking substantial flow of fluid through said first and second inlet ports respectively.

3. A fluid coupling device of the type including a first rotatable coupling member defining an axis of rotation, cover means associated with said first member to define a fluid chamber therebetween, valve means including a wall member disposed to separate said fluid chamber into a fluid operating chamber and a fluid reservoir chamber, a second rotatable coupling member disposed in said fluid operating chamber and being rotatable relative to said first coupling member, said valve means being operable to control the flow of fluid between said reservoir chamber and said operating chamber and including said wall member defining a fluid inlet port and a valve member disposed in said fluid reservoir chamber, actuation means operable to move at least a portion of said valve member in an axial direction in response to an input signal; characterized by:

(a) said actuation means including an actuating member disposed to move along said axis of rotation from a normal position forwardly toward said cover means when said input signal dictates operation in a disengaged mode;

(b) one of said valve means and said cover means defining first and second fulcrum points, disposed diametrically oppositely about said axis of rotation;

(c) said valve member comprising an elongated, generally flat member normally disposed adjacent said first and second fulcrum points and including an actuation portion disposed between said fulcrum points, said actuating member being in engagement with saiq actuation portion of said valve member; and (d) said valve member including a pair of terminal portions, one of which is disposed to be spaced axially forwardly of said fluid inlet port when said actuating member is in said normal position, whereby movement of said actuating member toward said cover means results in corresponding movement of said actuation portion of said valve member and rearward movement of said terminal portions to a position in which said one terminal portion blocks substantial flow of fluid through said inlet port.

4. A fluid coupling device as claimed in claim 3 characterized by said actuating member comprising an elongated member disposed in an elongated opening defined by said input shaft.

5. A fluid coupling device as claimed in claim 3 characterized by said terminal portions of said valve member lying in planes disposed at slight angles relative to the plane of said valve member.

6. A fluid coupling device as claimed in claim 3 characterized by said cover means defining said first and second fulcrum points.

7. A fluid coupling-device as claimed in claim 3 characterized by a generally U-shaped fulcrum element to said cover means and defining said first and second fulcrum points, said fulcrum element being configured to restrain axially movement of said valve member.

* * * * *